United States Patent

Bigi et al.

[11] Patent Number: 5,983,148
[45] Date of Patent: Nov. 9, 1999

[54] METHOD OF CONTROLLING ACTIVATION OF A VEHICLE OCCUPANT RESTRAINT SYSTEM, CONTROL SYSTEM AND VEHICLE OCCUPANT RESTRAINT SYSTEM

[75] Inventors: Dante Bigi, Mutlangen; Allen Charles Bosio, Leinzell, both of Germany

[73] Assignee: TRW Occupant Restraint Systems GmbH, Alfdorf, Germany

[21] Appl. No.: 08/823,290

[22] Filed: Mar. 21, 1997

[30] Foreign Application Priority Data

Mar. 25, 1996 [DE] Germany ............... 196 11 718

[51] Int. Cl.$^6$ ........................................ G06F 17/00
[52] U.S. Cl. ........................ 701/45; 701/46; 180/268
[58] Field of Search .......................... 701/45, 46, 47, 701/7, 8; 180/268, 270; 280/735, 736, 739

[56] References Cited

U.S. PATENT DOCUMENTS

| | | | |
|---|---|---|---|
| 3,713,667 | 1/1973 | Blanchard | 280/735 |
| 4,620,721 | 11/1986 | Scholz et al. | 280/735 |
| 5,202,831 | 4/1993 | Blackburn et al. | 701/46 |
| 5,209,510 | 5/1993 | Mamiya | 280/735 |
| 5,216,607 | 6/1993 | Diller et al. | 701/45 |
| 5,262,949 | 11/1993 | Okano et al. | 701/46 |
| 5,338,063 | 8/1994 | Takeuchi et al. | 280/735 |
| 5,394,328 | 2/1995 | Huang | 701/45 |
| 5,400,867 | 3/1995 | Muller et al. | 180/268 |
| 5,413,378 | 5/1995 | Steffens, Jr. et al. | 180/268 |
| 5,490,066 | 2/1996 | Gioutsos et al. | 701/45 |
| 5,497,327 | 3/1996 | Takaya et al. | 280/735 |
| 5,541,842 | 7/1996 | Gioutsos et al. | 701/45 |
| 5,626,359 | 5/1997 | Steffens, Jr. et al. | 180/268 |
| 5,670,853 | 9/1997 | Bauer | 280/735 |

FOREIGN PATENT DOCUMENTS

| | | |
|---|---|---|
| 0382552 | 8/1990 | European Pat. Off. |
| 3413768 | 7/1985 | Germany. |
| 48-9893 | 3/1973 | Japan. |
| 4994031 | 9/1974 | Japan. |
| 52-140134 | 11/1977 | Japan. |
| 3121951 | 5/1991 | Japan. |
| 47966 | 1/1992 | Japan. |
| 572601 | 10/1993 | Japan. |
| 79931 | 1/1995 | Japan. |
| 7165008 | 6/1995 | Japan. |
| 7186879 | 7/1995 | Japan. |
| 7196006 | 8/1995 | Japan. |
| 7277123 | 10/1995 | Japan. |
| 8127306 | 5/1996 | Japan. |
| 8127310 | 5/1996 | Japan. |
| 9511819 | 5/1995 | WIPO. |

*Primary Examiner*—William A. Cuchlinski, Jr.
*Assistant Examiner*—Gertrude Arthur
*Attorney, Agent, or Firm*—Tarolli, Sundheim, Covell, Tummino & Szabo

[57] ABSTRACT

A method of controlling multistage activation of a vehicle occupant restraint system having a gas generator and adapted to be activated in a plurality of activation stages includes measuring differences in velocity occurring during a vehicle collision. A point in time as of which differences in velocity are measured is determined. A point in time as of which a predetermined first threshold value of the differences in velocity is attained is determined. The intensity of the vehicle collision is determined from the time difference of the points in time. Different output signals are furnished depending on the values established by determining the points in time for initiating different ones of the plurality of activation stages in activating the restraint system, in accordance with the determined intensity of the vehicle collision.

16 Claims, 3 Drawing Sheets

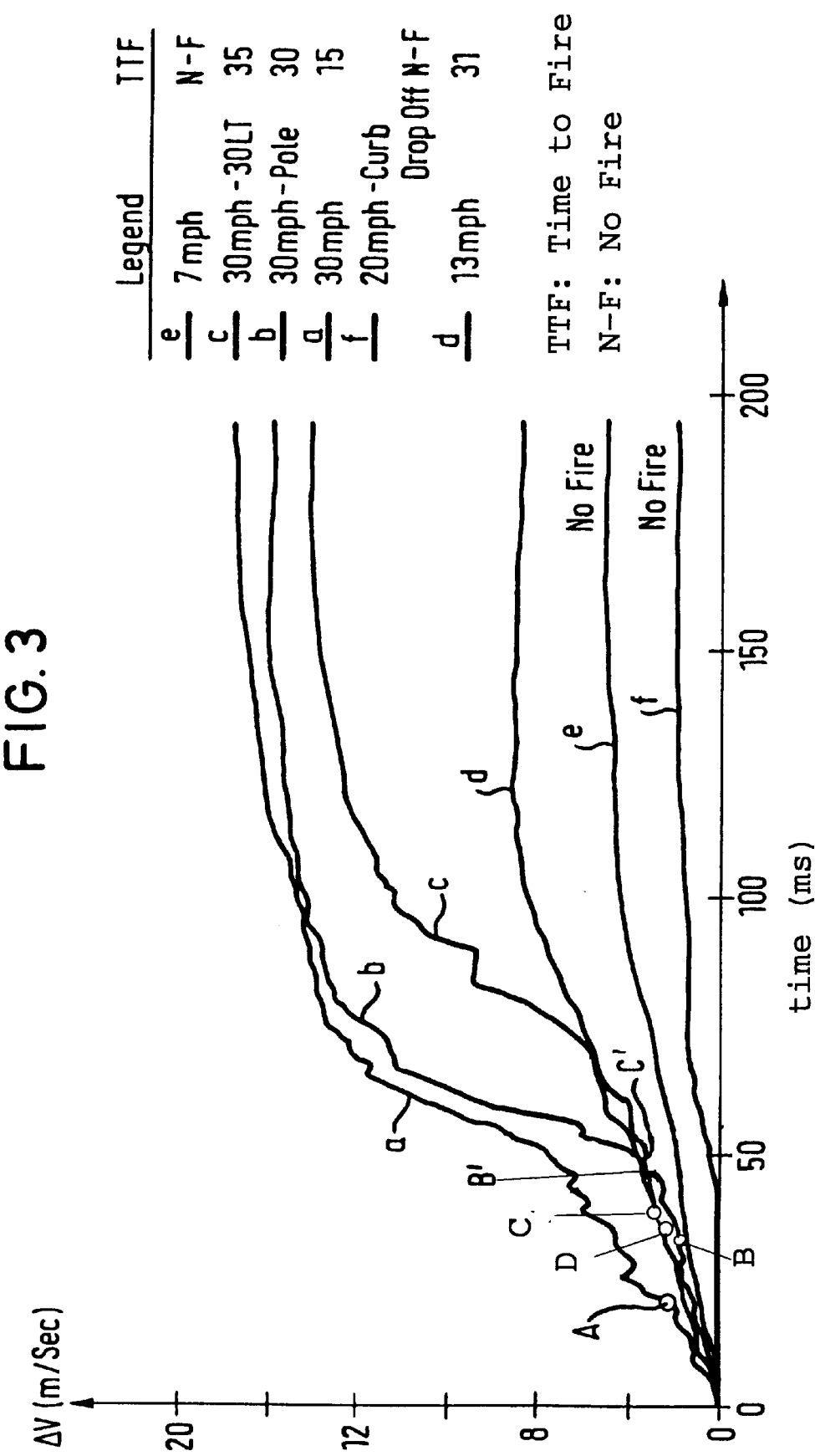

METHOD OF CONTROLLING ACTIVATION OF A VEHICLE OCCUPANT RESTRAINT SYSTEM, CONTROL SYSTEM AND VEHICLE OCCUPANT RESTRAINT SYSTEM

TECHNICAL FIELD

The invention relates to a method of controlling multi-stage activation of a vehicle occupant restraint system including a gas generator. In addition, the invention relates to a control system for implementing said method and a vehicle occupant restraint system.

BACKGROUND OF THE INVENTION

Existing methods for controlling activation of a vehicle occupant restraint system work according to the following: the intensity with which a vehicle is delayed is continuously detected so that a function of the acceleration with time materializes. This function is continuously derived parallel to measuring the delay so that, expressed on the basis of an evolution of an acceleration curve over the time, the gradient of the acceleration curve can be established. This gradient is compared to a predetermined gradient threshold value. As soon as this gradient threshold value is attained the vehicle occupant restraint system is activated.

The aforementioned method used hitherto for controlling activation of a vehicle occupant restraint system has the drawback that it may take too long in some circumstances until a second stage of a multistage gas generator is activated since activation does not occur until a gradient threshold value is attained. Since differing parts of the vehicle, deformed one after the other, may also absorb differing work of deformation, the acceleration values may fluctuate very strongly. This is why, as a rule, the gradient of the acceleration is averaged. Since the averaged acceleration as described before increases only relatively slowly, circumstances may arise in which the gradient threshold is attained relatively late which may result in delays in activating the restraint system.

From DE 29 44 319 A1 a multichamber gas bag is known which depending on the strength of delay in an accident is inflated partly or completely by several ignition stages activatable one after the other. For this purpose a sensor system for sensing the delay is provided which activates the first or, displaced herefrom in time, also further ignition stages of a gas generator. How this sensor system works precisely, however, is not stated in this document.

BRIEF SUMMARY OF THE INVENTION

The invention provides a method which avoids delayed activation of a vehicle occupant restraint system.

The method of controlling multistage activation of a vehicle occupant restraint system including a gas generator comprises the steps of:

a) vehicle sensitive measurement of the differences in velocity occurring during a vehicle collision, b) determining a point in time as of which the differences in velocity are measured, c) determining a point in time as of which a predetermined first threshold value of the differences in velocity is attained, d) determining the intensity of the vehicle collision from the time difference of the points in time established in steps b) and c), and e) furnishing different output signals depending on the values established by the steps b) and c) for initiating different stages in activating the restraint system, in accordance with the determined intensity of the vehicle collision.

The method according to the invention determines how grave the accident is not on the basis of the gradient of the acceleration curve but on the basis of the difference in time between commencement of occurence of velocity difference values and attainment of a predetermined velocity difference threshold value. As a function thereof, differing output signals are furnished which initiate differing stages in activating the restraint system. If, for example, a velocity difference threshold value is attained very early, one, or in an advantageous aspect, all activation stages are initiated at the same time. Accordingly, in circumstances in which a first threshold value is attained, there is no longer a wait until a second threshold value has been attained. Instead, on the basis of an initial measurement the maximum difference in velocity and thus the gravity of the accident is forecasted so-to-speak. If, by contrast, a given difference in velocity, which is assigned to a vehicle collision of lower intensity, is attained at a relatively late point in time this is taken as an indication of a less grave accident so that only one stage in activation is initiated.

In accordance with one preferred embodiment in addition sensing of the belt system is provided to detect whether or not a vehicle occupant has buckled up. The corresponding signal is additionally included in determining the output signals. If, for instance, a vehicle occupant has not buckled up, a corresponding output signal needs to be furnished which initiates a stage in the activation corresponding to a vehicle collision of high intensity, so that e.g. with employment of a multichamber gas bag, all chambers are inflated, this despite merely an instance of low intensity vehicle collision possibly being involved.

In addition to this, it may also be established whether. or not a child seat is provided, the corresponding signal then being taken into account in determining the output signals. Accordingly, an activation stage is initiated which is geared to the existence of a child seat so that a correspondingly configured gas bag is inflated only partially or not at all, depending on the circumstances involved.

Preferably, when a predetermined time difference threshold value is reached, several activation stages are initiated at least roughly simultaneously by the time difference of step d), so that there is no longer a need to wait until a second velocity difference threshold value is achieved which is greater than the first one. If, for this reason, a velocity difference threshold value is achieved very quickly, this is a sure indication of a vehicle collision at high intensity so that all activation stages can be initiated at the same time to lose no time in inflating a gas bag.

It may further be detected within a given short period of time from having initiated a first activation stage, whether there has been a change in the velocity difference in the meantime. If this has materialized, a second activation stage is subsequently initiated, said second activation stage being initiated already prior to timeout of the given period of time when a predetermined second velocity difference threshold value is attained which is greater than the first. On top of this it is also possible to initiate one or more further activation stages, irrespective of any change in the difference in velocity, always on termination of the given short period of time after initiation of the activation stage, if the velocity does not drop appreciably. It may, of course, also be provided for in this case that in the absence of a child seat further activation stages are not initiated.

The invention further provides a control system for implementing the method according to the invention. The control system includes a measurement sensor for sensing the intensity of vehicle collision. The measurement sensor is configured as a sensor continually sensing changes in velocity. The control system further includes a control unit for comparing a change in velocity to given velocity difference threshold value, for determining the time difference, for comparing the time difference to predetermined time difference threshold values and for furnishing the differing output signals. In this arrangement the sensor may either output the velocity difference values in the predetermined time spacings by itself or the control unit may poll the current velocity values e.g. in predetermined time spacings via the sensor.

If required, a belt sensor, preferably a buckle sensor, may be provided which determines whether a vehicle occupant has buckled up or not. As well, a child seat detector may be provided.

Further, the invention provides a vehicle occupant restraint system including such an aforementioned control system. The restraint system comprises a gas generator which is configured so that it is able to produce differing gas bag internal pressures as a function of the output signals of the control unit. Thus, the gas bag is inflated more or less strongly.

In this arrangement the gas generator is preferably configured as a multistage gas generator also comprising an orifice controllable by the control unit.

The multichamber gas bag comprises two advantage wall components of a fabric having a reduced gas permeability with increasing gas bag internal pressure.

BRIEF DESCRIPTION OF THE DRAWINGS

FIG. 3 is a ΔV-T plot of six curves illustrating the sequence of events in vehicle collisions of differing intensity.

DETAILED DESCRIPTION OF THE PREFERRED EMBODIMENTS

Figure 1:
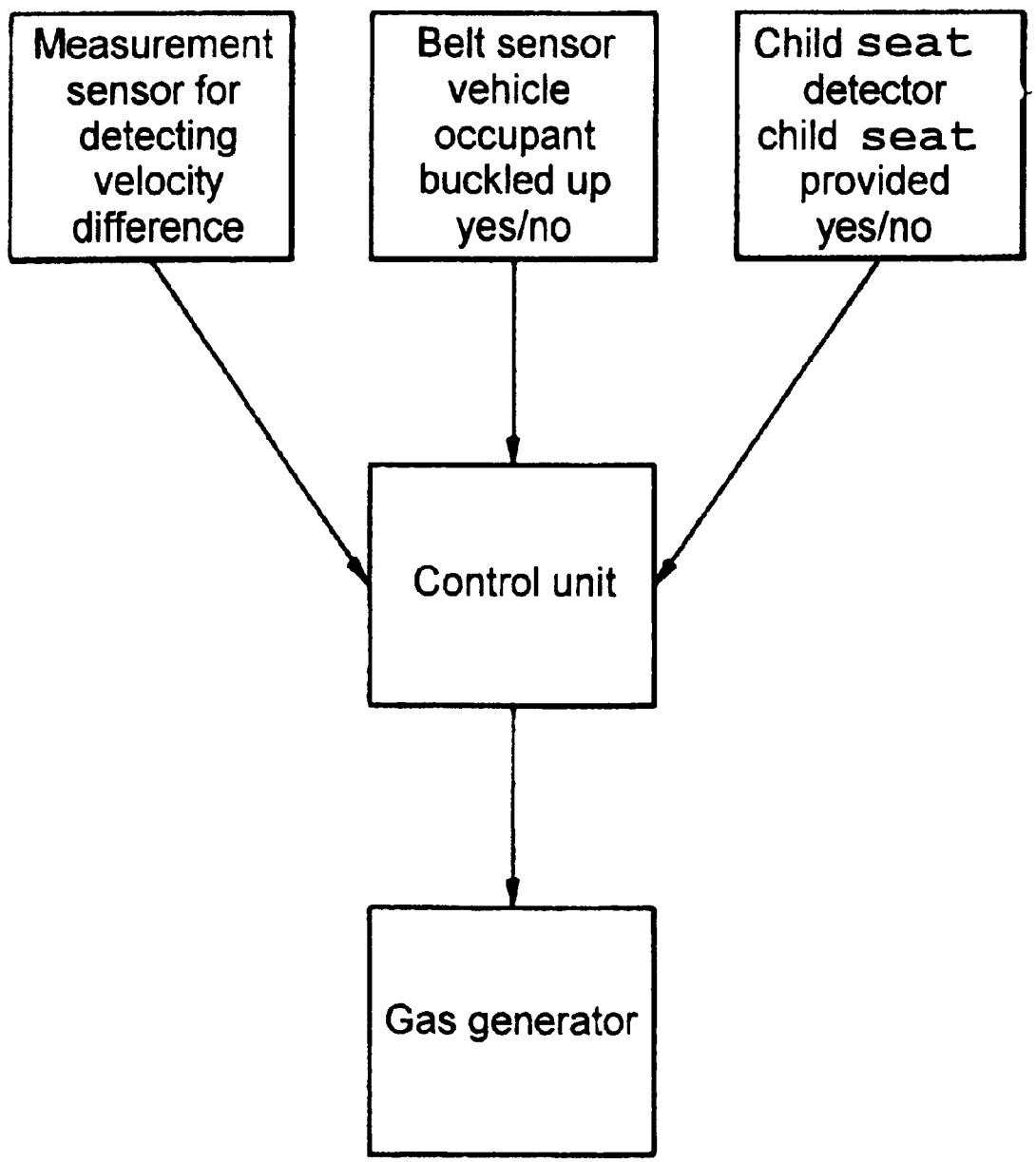
FIG. 1 schematically shows the configuration of the control system according to the invention for implementing the method according to the invention.

In FIG. 1 a system for controlling multistage activation of a vehicle occupant restraint system including a multichamber gas bag is shown schematically. The control system comprises a measurement sensor for detecting the difference in velocity, this sensor continuously sensing the change in velocity of a vehicle during a collision. The control system further includes a belt sensor which detects whether or not a vehicle occupant has buckled up, as well as a child restraint detector establishing whether or not a child restraint is provided. The measurement sensor, belt sensor and child seat detector furnish corresponding data to a control unit which evaluates these data and, as a function thereof, initiates differing stages of activation of a multistage gas generator.

Figure 2:
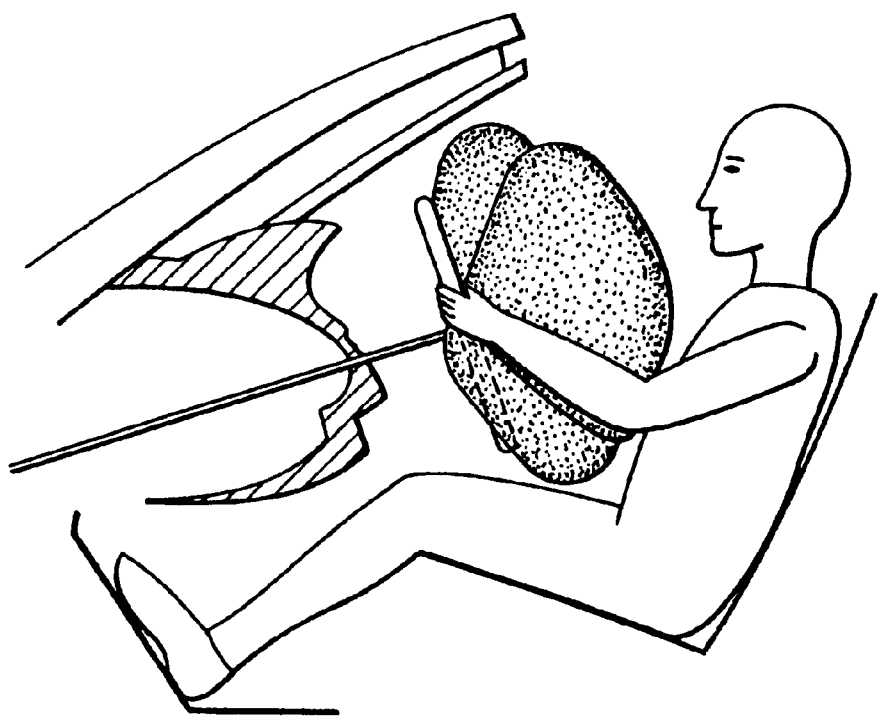
FIG. 2 shows a gas bag restraint system with a single multichamber gas bag in fully inflated condition.

In FIG. 2 a multichamber gas bag is illustrated with which the control system according to FIG. 1 cooperates. As will be detailed further in the following, one or more activation stages may be initiated for a multistage gas generator assigned to the multichamber gas bag thus controlling whether one or more chambers are to be inflated and the chamber internal pressures to exist within the chambers.

In this arrangement the control system shown in FIG. 1 works as follows. The measurement sensor detects, preferably continuously during the accident, the resulting differences in velocity and passes them on to the control unit. In turn, the control unit determines, on the one hand, the commencement of the point in time as of which the velocity difference values are to be measured and, in addition, the point in time as of which a predetermined velocity difference threshold value is achieved. For this purpose the furnished differences in velocity are continuously compared to the threshold value of the difference. The control unit determines the difference in time from the two points in time and compares it to the given time difference threshold values. Depending on which time difference threshold values are attained, the control unit furnishes differing output signals for initiating differing stages in the activation of a restraint system, in this case the multichamber gas bag.

The signal made available by the belt sensor of the control unit is incorporated in the output signals. If for instance the collision intensity is not particularly high so that only one activation stage needs to be initiated, this presupposes that the vehicle occupant has buckled up. If he has not buckled up, all activation stages are triggered irrespective of the intensity.

If a child seat exists then, for instance, only one activation stage or even no control system at all may be initiated to prevent injury due to inflation of the gas bag.

Within a given short period of time as of which initiation of the first activation stage is initiated, the system detects whether the difference in velocity has since changed and, if so, the second activation stage is initiated, whereby the latter may be initiated even prior to timeout of the given periode of time should the predetermined second velocity difference threshold value be attained. It is alternatively also possible to initiate the further activation stage always on timeout of the given short period of time as of initiation of the first activation stage, irrespective of any change in velocity, when the velocity has failed to have since become reduced appreciably.

With reference to FIG. 3 the method will now be explained in more detail by its various possible profiles, "e" illustrating the profile of a vehicle collision of very low intensity in which a predetermined first velocity difference threshold value is not attained, resulting in the gas bag not being inflated. The profiles as indicated by the curves "a" to "d" characterize accidents involving higher intensity of vehicle collision in each case. Curve "a" characterizes an accident wherein a vehicle crashes against a wall with 30 mph. Curve "b" characterizes an accident wherein a vehicle crashes against a pole with 30 mph. Curve "c" characterizes an accident wherein a vehicle crashes under an angle of 30° against a wall. Curve "d" characterizes an accident wherein a vehicle impacts a wall with 13 mph. Finally, curve "f" characterizes the evolution of velocity difference over the time when a vehicle drops off a curb with 20 mph.

In the vehicle collision as depicted by curve "a" the intensity is so high that a predetermined first velocity difference threshold value is attained extremly early (point in time "A"). The difference in time from the measurement of the differences in velocity up to the threshold value being attained is thus very short, so that a predetermined time difference threshold value is attained, corresponding to a vehicle collision of high intensity. Accordingly, at the point "A" not only the first chamber of the gas bag but also the second chamber is inflated at the same time.

With increasing time the first velocity difference threshold value is also elevated as is evident from the points "B", "C"

and "D", which are assigned to the curves "b", "c" and "d" respectively. The first velocity difference threshold value is attained on curve "b" at a relatively late point in time. As soon as the threshold value is attained the first activation stage is initiated. Subsequently, a given short period of time, preferably 15 ms is waited for, after which the system evaluates whether the difference in velocity has changed in the meantime. If the difference in velocity has become greater the second activation stage is instantly initiated on timeout of the short period of time. Since, however, on curve "b" a second velocity difference threshold value is attained before timeout of the given period of time (point "B") which is greater than the first, the second activation stage is initiated in advance. On the curve "c" the second velocity difference threshold value is not attained so that, since the velocity has failed to drop appreciably in the meantime, the second activation stage is initiated on timeout of the short period of time (point "c").

It may also be provided for in the control system that establishing whether the difference in velocity, having occured since triggering of the first activation stage, has exceeded a certain value is not done until timeout of the short period of time. If this is not the case, the second activation stage is not initiated even on timeout of the given short period of time. Curve "d" depicts such a profile in which only the first activation stage is initiated since the curve runs relatively flat and the difference in velocity is hardly increased after the first velocity difference threshold value is attained.

Figure 4:
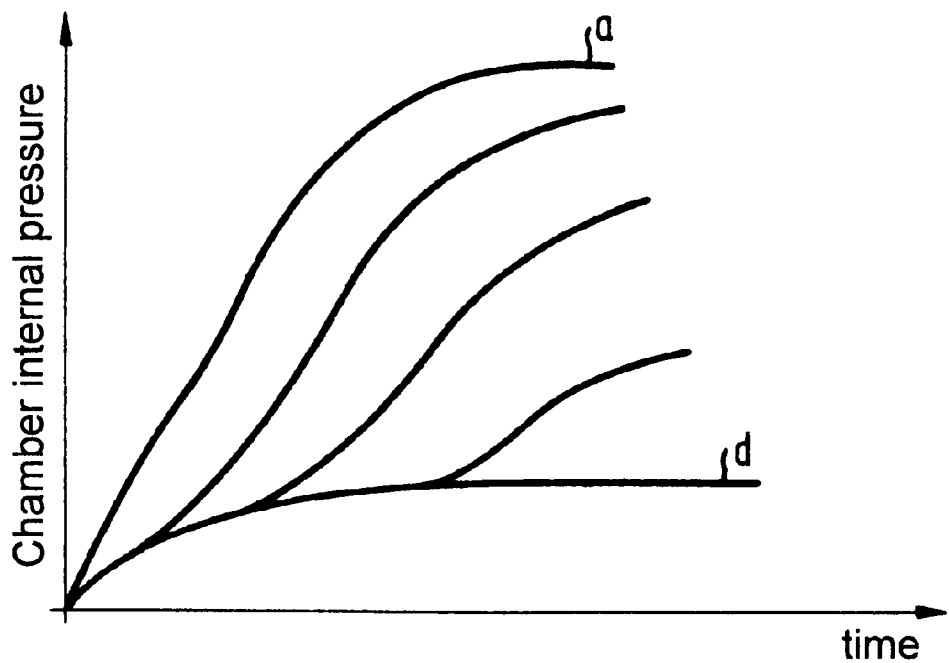
FIG. 4 is a plot of chamber internal pressure related to time, illustrating the effects of the various activation stages on the chamber internal pressure of a multichamber gas bag.

In FIG. 4 the various chamber pressures are indicated. Curve "d" shows the pressure profile in a chamber when a low-intensity vehicle collision is the case. By contrast, the curve "a" illustrates the chamber pressure profile in the case of a high intensity, in which e.g. several stages of a gas generator are instantly ignited and the chamber of a gas bag is inflated very quickly. Between these two cases there exists a wealth of further possible modifications in which, for instance, higher chamber internal pressures are provided for not until certain differential threshold values of velocity or time have been attained.

For controlling these internal pressures a gas generator may include a controllable orifice, the bore of which may be made greater or smaller, depending on the corresponding signals of the control unit.

In the multichamber gas bag depicted in FIG. 2 the chambers may be also inflated individually, an activation stage being assigned to each chamber. In addition, the wall components of the multichamber gas bag comprise a fabric which features a reduced gas bag permeability with increasing gas bag internal pressure, one such fabric being e.g. a so-called "smart" fabric.

We claim:

1. A method of controlling multistage activation of a vehicle occupant restraint system including a gas generator, the vehicle occupant restraint system being adapted to be activated in a plurality of activation stages, comprising the steps of:
   a) vehicle sensitive measurement of differences in velocity occuring during a vehicle collision,
   b) determining a point in time as of which differences in velocity are measured,
   c) determining a point in time as of which a predetermined first threshold value of said differences in velocity is attained,
   d) determining the intensity of said vehicle collision from the time difference of said points in time established in steps b) and c), and
   e) furnishing different output signals depending on the values established by the steps b) and c) for initiating different ones of said plurality of activation stages in activating said restraint system, in accordance with said determined intensity of said vehicle collision.

2. The method as set forth in claim 1, wherein sensing of a belt system, which defines a part of said vehicle occupant restraint system, is provided in addition to the steps a) and b) to detect whether or not a vehicle occupant has buckled up and in that a corresponding signal is taken into account in determining said output signals.

3. The method as set forth in claim 1, wherein in addition to the steps a) and b) it is further established whether a child seat is provided and in that a corresponding signal is taken into account in determining said output signals.

4. The method as set forth in claim 1, wherein several activation stages are initiated at least roughly simultaneously by the time difference of step d) when a predetermined time difference threshold value is reached.

5. A control system for implementing the method as set forth in claim 1, including a measurement sensor for sensing said intensity of said vehicle collision, said measurement sensor being configured as a sensor continually sensing changes in velocity, and a control unit for comparing a change in velocity to given velocity difference threshold values, for determining said time difference, for comparing said time difference to predetermined time difference threshold values and for furnishing differing output signals.

6. The control system as set forth in claim 5, further including a belt sensor which is able to determine whether or not said vehicle occupant has buckled up.

7. The control system as set forth in claim 6, wherein said belt sensor is a buckle sensor.

8. The control system as set forth in claim 5, further including a child seat detector.

9. A vehicle occupant restraint system including a control system as set forth in claim 5, comprising at least one gas generator which is configured so that it is able to produce differing gas bag internal pressures as a function of said output signals of said control unit.

10. The vehicle occupant restraint system as set forth in claim 9, wherein said gas generator is a multistage gas generator.

11. The vehicle occupant restraint system as set forth in claim 9, wherein said gas generator comprises an orifice controllable by said control unit.

12. The vehicle occupant restraint system as set forth in claims 9, comprising a multistage gas bag having several chambers which are inflatable individually and are each assigned to an activation stage.

13. The vehicle occupant restraint system as set forth in claim 12, wherein said multichamber gas bag comprises wall components of a fabric having a reduced gas permeability with increasing gas bag internal pressure.

14. A method of controlling multistage activation of a vehicle occupant restraint system including a gas generator, the vehicle occupant restraint system being adapted to be activated in a plurality of activation stages, comprising the steps of:
   a) vehicle sensitive measurement of differences in velocity occuring during a vehicle collision,
   b) determining a point in time as of which differences in velocity are measured,
   c) determining a point in time as of which a predetermined first threshold value of said differences in velocity is attained,
   d) determining the intensity of said vehicle collision from the time difference of said points in time established in steps b) and c), and e) furnishing different output signals depending on the values established by the steps b) and c) for initiating different ones of said plurality of activation stages in activating said restraint system, in accordance with said determined intensity of said vehicle collision, a first activation stage being initiated and, within a given short period of time from having initiated said first activation stage, it is established whether there has been a change in said velocity difference in the meantime, and if said velocity difference has increased a second activation stage is subsequently initiated, wherein said second activation stage is initiated already prior to timeout of said given period of time when a predetermined second velocity difference threshold value is attained which is greater than said first.

15. The method as set forth in claim 14, wherein said second activation stage, irrespective of any change in said difference in velocity, is initiated always on termination of said given short period of time after initiation of said first activation stage, if the velocity does not drop appreciably.

16. A method of controlling multistage activation of a vehicle occupant restraint system including a gas generator, the vehicle occupant restraint system being adapted to be activated in a plurality of activation stages, comprising the steps of:

a) vehicle sensitive measurement of differences in velocity occuring during a vehicle collision, b) determining a point in time as of which differences in velocity are measured, c) determining a point in time as of which a predetermined first threshold value of said differences in velocity is attained, d) determining the intensity of said vehicle collision from the time difference of said points in time established in steps b) and c), and e) furnishing different output signals depending on the values established by the steps b) and c) for initiating different ones of said plurality of activation stages in activating said restraint system, in accordance with said determined intensity of said vehicle collision, said first velocity difference threshold value being elevated by a predetermined amount with increasing time as of measurement of velocity difference values.

* * * * *